United States Patent
Wang et al.

(10) Patent No.: US 11,310,392 B2
(45) Date of Patent: Apr. 19, 2022

(54) FLUID-OPTICAL ENCRYPTION SYSTEM AND METHOD THEREOF

(71) Applicant: National Tsinghua University, Hsinchu (TW)

(72) Inventors: Wei-Chih Wang, Hsinchu (TW); David R. Schipf, Seattle, WA (US)

(73) Assignee: National Tsinghua University, Hsinchu (TW)

( * ) Notice: Subject to any disclaimer, the term of this patent is extended or adjusted under 35 U.S.C. 154(b) by 1038 days.

(21) Appl. No.: 15/838,646

(22) Filed: Dec. 12, 2017

(65) Prior Publication Data
US 2019/0182407 A1    Jun. 13, 2019

(51) Int. Cl.
*H04N 1/44* (2006.01)
*H04L 9/08* (2006.01)
*G06F 21/60* (2013.01)

(52) U.S. Cl.
CPC ........... *H04N 1/4486* (2013.01); *G06F 21/60* (2013.01); *H04L 9/0825* (2013.01); *H04L 9/0869* (2013.01); *H04L 2209/04* (2013.01)

(58) Field of Classification Search
CPC ..... H04N 1/4486; G06F 21/60; H04L 9/0825; H04L 9/0869; H04L 2209/04
See application file for complete search history.

(56) References Cited

U.S. PATENT DOCUMENTS

| 6,233,339 | B1 * | 5/2001 | Kawano | G06Q 20/40975 380/44 |
| 8,203,788 | B2 * | 6/2012 | Gluckstad | G02B 27/0927 359/559 |

OTHER PUBLICATIONS

Bor Wang, Shift-tolerance property of an optical double-random phase-encoding encryption system, Oct. 2000; https://www.researchgate.net/publication/5502504_Shift-Tolerance_Property_of_an_Optical_Double-Random_Phase-Encoding_Encryption_System (Year: 2000).*

* cited by examiner

*Primary Examiner* — Fatoumata Traore
*Assistant Examiner* — Thanh H Le
(74) *Attorney, Agent, or Firm* — Lin & Associates Intellectual Property, Inc.

(57) ABSTRACT

The present disclosure provides a fluid-optical encryption system and a method thereof. The fluid-optical encryption system uses a fluid surface that changes topology over time to modulate the wave front of an electromagnetic signal in an encryption, decryption, authentication or other communication system. The electromagnetic signal can be pulsed or continuous, coherent or non-coherent, and can be optical or in another wavelength range such as micrometer or infrared. The information carrying signal is either transmitted through the fluid system or reflected off the surface of the fluid system. The fluid system time dependent change can be induced by mechanical vibration in the fluid container, distorting the fluid container, acoustic waves through the fluid, or by surface tension changes at the boundary of the fluid cause by electrowetting or electrostatic effects. The fluid surface can exhibit patterns that oscillate or change periodically, or change in a chaotic manner.

15 Claims, 12 Drawing Sheets

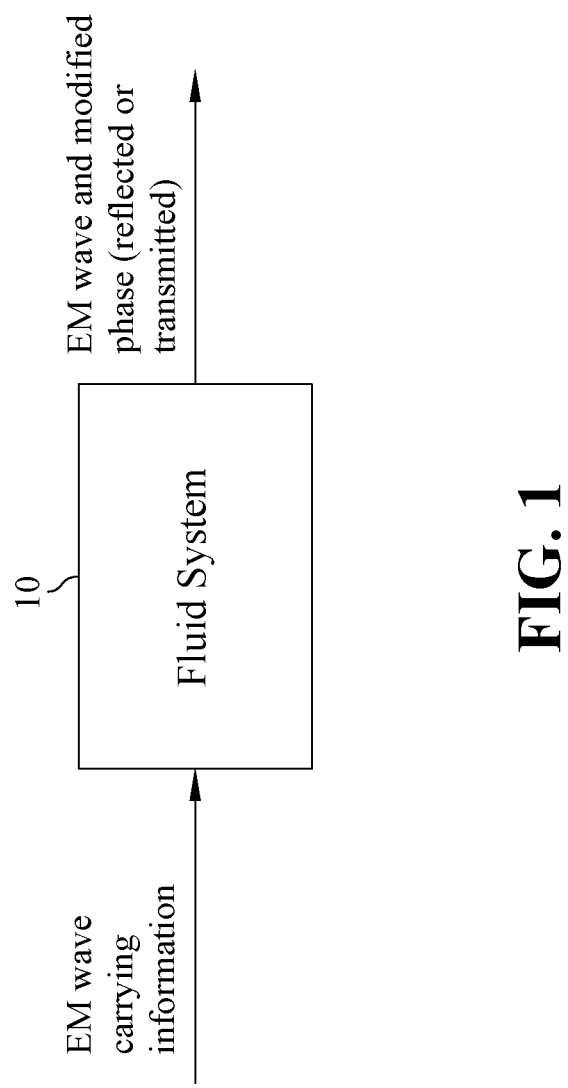

FLUID-OPTICAL ENCRYPTION SYSTEM AND METHOD THEREOF

BACKGROUND OF THE INVENTION

1. Field of the Invention

The presented disclosure describes the use of a spatially and temporally varying fluid surface and/or boundary that encodes an electromagnetic (EM) radiation.

2. The Prior Arts

Optical Cryptography has emerged onto the security scene as an approach to encrypt and authenticate images. Optical beams, and electromagnetic (EM) beams of other frequency ranges, offer the potential for manipulation in polarization, phase, intensity, and frequency components for encoding. Additional Quantum mechanical effects can be used with optical security and communication systems to improve security. It is worth-while to explore new methods in optical communication to meet the needs of growing applications and move in a direction of greater practicality.

One of the most widely and thoroughly studied optical encryption systems is the double random phase encryption (DRPE) system. The DRPE system is formidable against brute force attacks because it employs two random phase masks, one in the image plane and one in the Fourier plane, to encrypt and decrypt images with monochromatic, coherent light. These random phase masks constitute the key space of a DRPE system.

Many additions and modifications have been suggested for the DRPE. These adaptations have sought to increase complexity in the key space for added security and to provide different designs more suitable for certain application. One variant of the DRPE is the lens-less Fresnel transform system. Another design uses the placement of random phase elements in the fractional Fourier domains, creating a system mathematically similar to the Fresnel transforming system.

While more recently proposed optical encryption/decryption systems such as the iterative phase-retrieval encryption system, photon counting optical encryption, and phase truncated optical encryption show promise as more secure systems with larger key spaces than the DRPE, they do not possess the same simplicity of implementation. The uses of specialty equipment in photon counting and phase truncation make these methods more expensive and inflexible for implementation. The iterative phase-retrieval encryption system is an effective design, but requires a mechanical stage to move in increments during recording. The DRPE is still a simple design choice for optical encryption, and a useful system to study when researching new methods to solve security concerns found in most optical encryption systems.

Security studies on the DRPE and other similar systems have shown that known plaintext and known ciphertext attacks can be used to calculate the phase mask keys. If the image intensity is the plaintext, the system is vulnerable to a known-plaintext attack using a single or multiple binary intensity images. If the plaintext is a phase image, herein called fully-phase DRPE, the system is vulnerable to a known plaintext attack using multiple pairs of binary phase images.

A few previous filed patents describe using physical properties of fluids for encryption. U.S. Pat. No. 6,233,339B1 describes the method for using the pressure of a fluid as secretly defined information to be used for encryption. However, this invention does not describe spatial patterns on the surface or boundary of a fluid being used to encode an EM wave.

Optical encryption methods using spatially uniform phase delays and spatially varying phase modification to encode information have been developed. Examples include the "Free-space DQPSK demodulator" in U.S. Pat. No. 8,218,975B2, "Multichannel on a single wave laser over wave division multiplexing in free space optics using phase masks" in U.S. Pat. No. 8,244,137B1, "Method and apparatus for encryption using partial information" in U.S. Pat. No. 7,212,630B2, "Optical security system using Fourier plane encoding" in U.S. Pat. No. 7,428,099B1 and "Method and apparatus for encryption" U.S. Pat. No. 6,002,773A. However, these all involve using physical elements to encode EM waves for encryption, decryption, and authentication.

SUMMARY OF THE INVENTION

To overcome the aforementioned disadvantages of the conventional technology, the object of the present disclosure is to provide a fluid-optical encryption system and a method thereof.

In one embodiment of the present disclosure, the fluid-optical encryption system includes a first random phase element, a second random phase element, a first lens, a second lens and a fluid system, wherein an electromagnetic (EM) beam at a plane $U_0$ contains an image that has passed through a first random phase element or been encoded with random phase values; the EM beam at a plane $U_1$ passes through the fluid system; the second random phase element is positioned at a Fourier plane $U_F$ between the first lens and the second lens; a plane $U_E$ is the location of a camera or some photon detection devices for recording an encrypted image; and distances $d_1$, $z_1$ and focal length f are determined by a user and contribute to a key space.

In another embodiment of the present disclosure, the fluid-optical encryption system includes a first random phase element, a second random phase element, a first lens, a second lens and a fluid system, wherein an electromagnetic (EM) beam at a plane $U_0$ contains an image and passes through the first random phase element at a plane $U_1$; the second random phase element is positioned between a Fourier plane $U_F$ and the first lens; the fluid system is positioned at the Fourier plane $U_F$; a plane $U_E$ is the location of a camera or some photon detection devices for recording an encrypted image; and distances $d_1$, $z_1$, $d_2$, $d_3$, and focal length f are determined by a user and contribute to a key space.

In an alternative embodiment of the present disclosure, the fluid-optical encryption system includes a first random phase element, a second random phase element and a fluid system, wherein an electromagnetic (EM) beam at a plane $U_0$ contains an image; the first random phase element is located at a plane $U_1$; the second random phase element is positioned at a plane $U_2$; the fluid system is positioned at a Fourier plane $U_F$; a plane $U_E$ is the location of a camera or some photon detection devices for recording an encrypted image; and distances $d_1$, $d_2$, $d_3$, $d_4$, and focal length f are determined by the user and contribute to a key space.

Moreover, in one embodiment of the present disclosure, the fluid-optical encryption method includes the steps of containing an image by an electromagnetic (EM) beam at a plane $U_0$; the EM beam passing through a first random phase element or being encoded with random phase values; the EM beam at a plane $U_1$ passing through a fluid system; positioning a second phase element at a Fourier plane $U_F$ between a first lens and a second lens; and positioning a camera or some photon detection devices at a plane $U_E$ and recording an encrypted image, wherein distances $d_1$, $z_1$, and focal length f are determined by a user and contribute to a key space.

In another embodiment of the present disclosure, the fluid-optical encryption method includes the steps of containing an image by an electromagnetic (EM) beam at a plane $U_0$; the EM beam passing through a first random phase element at a plane $U_1$; positioning a second random phase element between a Fourier plane $U_F$ and a first lens; positioning a fluid system at the Fourier plane $U_F$; and positioning a camera or some photon detection devices at a plane $U_E$ and recording an encrypted image, wherein distances $d_1$, $z_1$, $d_2$, $d_3$, and focal length f are determined by a user and contribute to a key space.

In an alternative embodiment of the present disclosure, the fluid-optical encryption method includes the steps of containing an image by an electromagnetic (EM) beam at a plane $U_0$; respectively positioning a first random phase element, a second element and a fluid at a plane $U_1$, a plane $U_2$ and a Fourier plane $U_F$; and positioning a camera or some photon detection devices at a plane $U_E$ and recording an encrypted image, wherein distances $d_1$, $d_2$, $d_3$, $d_4$, and focal length f are determined by a user and contribute to a key space.

BRIEF DESCRIPTION OF THE DRAWINGS

FIG. 1 is an electromagnetic (EM) wave (e.g. continuous optical beam) carrying information transmitted through or reflected from a fluid system. The boundary or surface profile changes of the fluid surface modify the phase of the EM wave, thereby modifying the information in the EM wave.

DETAILED DESCRIPTION OF THE PREFERRED EMBODIMENT

The present disclosure may be embodied in various forms, and the details of the preferred embodiments of the present disclosure will be described in the subsequent contents with reference to the accompanying drawings. The drawings (not to scale) show and depict only the preferred embodiments of the present disclosure, and will not be considered as limitations to the scope of the present disclosure. Modifications of the present disclosure should be considered within the spirit of the present disclosure.

As shown in FIG. 1, the present disclosure is the employment and actuation of a fluid system 10 to change the phase of an electromagnetic (EM) wave, encoding the wave with information. The phase change is produced by time-dependent changes on the surface or boundary of the fluid system 10, or on a boundary profile between two fluids in a system. This encoding can be used for EM wave communication and to encrypt/decrypt images or series of images. A basic diagram of this process is shown in FIG. 1.

Figure 2A:
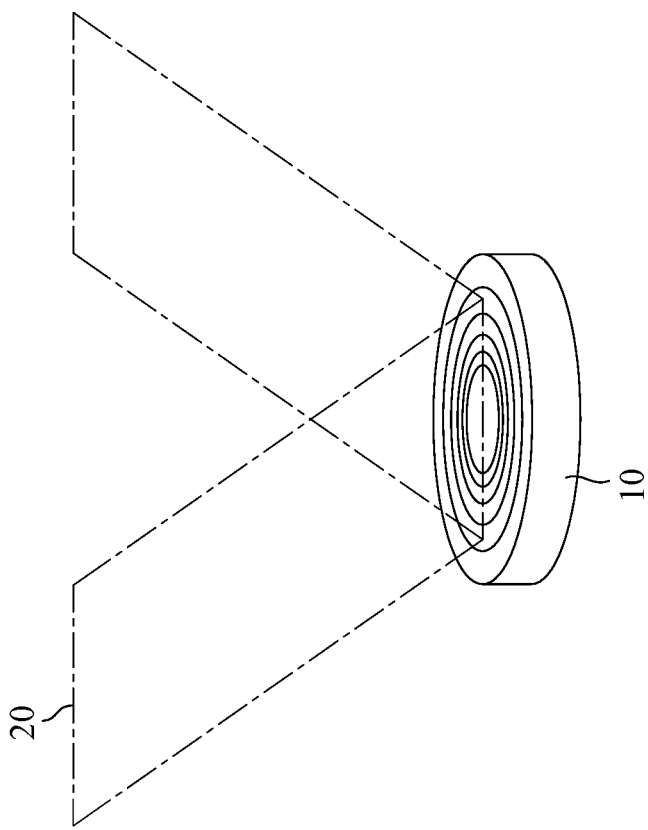
FIG. 2a is an EM beam reflected off a fluid that exhibits user defined surface patterns.
Figure 2B:
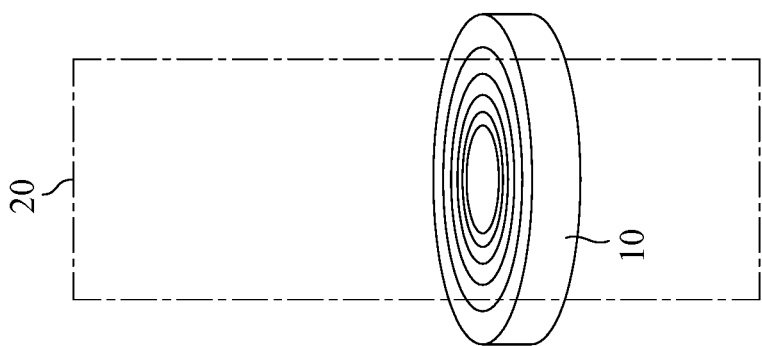
FIG. 2b is an EM beam transmitted through a fluid that exhibits user defined surface patterns, wherein the EM beam is altered according to the surface pattern of the fluid.

The fluid imparts a phase change on a pulsed or continuous EM beam 20 that consists of wavelengths in any range between microwaves (~10 cm) and the extreme ultraviolet (~10 nm), which includes the visible band. FIG. 2a is an EM beam reflected off a fluid that exhibits user defined surface patterns. FIG. 2b is an EM beam transmitted through a fluid that exhibits user defined surface patterns. The EM beam is altered according to the surface pattern of the fluid. Therefore, completely coherent, temporally or spatially coherent, or non-coherent EM beams 20 can be used, and the phase change can be either resulting from transmission through the fluid or reflection off the fluid. It is important to point out that the fluid is in the path of the EM beam to alter the phase, path length or polarization of the EM beam directly.

Figure 3:
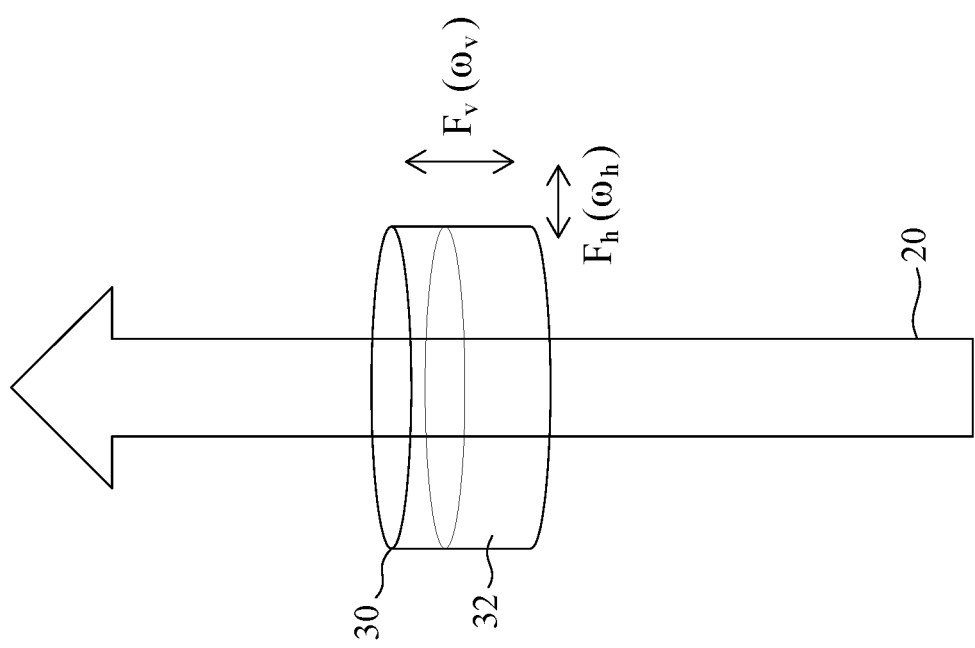
FIG. 3 is an EM beam transmitted through a fluid that exhibits surface patterns according to a horizontal vibration $F_h$, vertical vibration $F_v$, or both.
Figure 4:
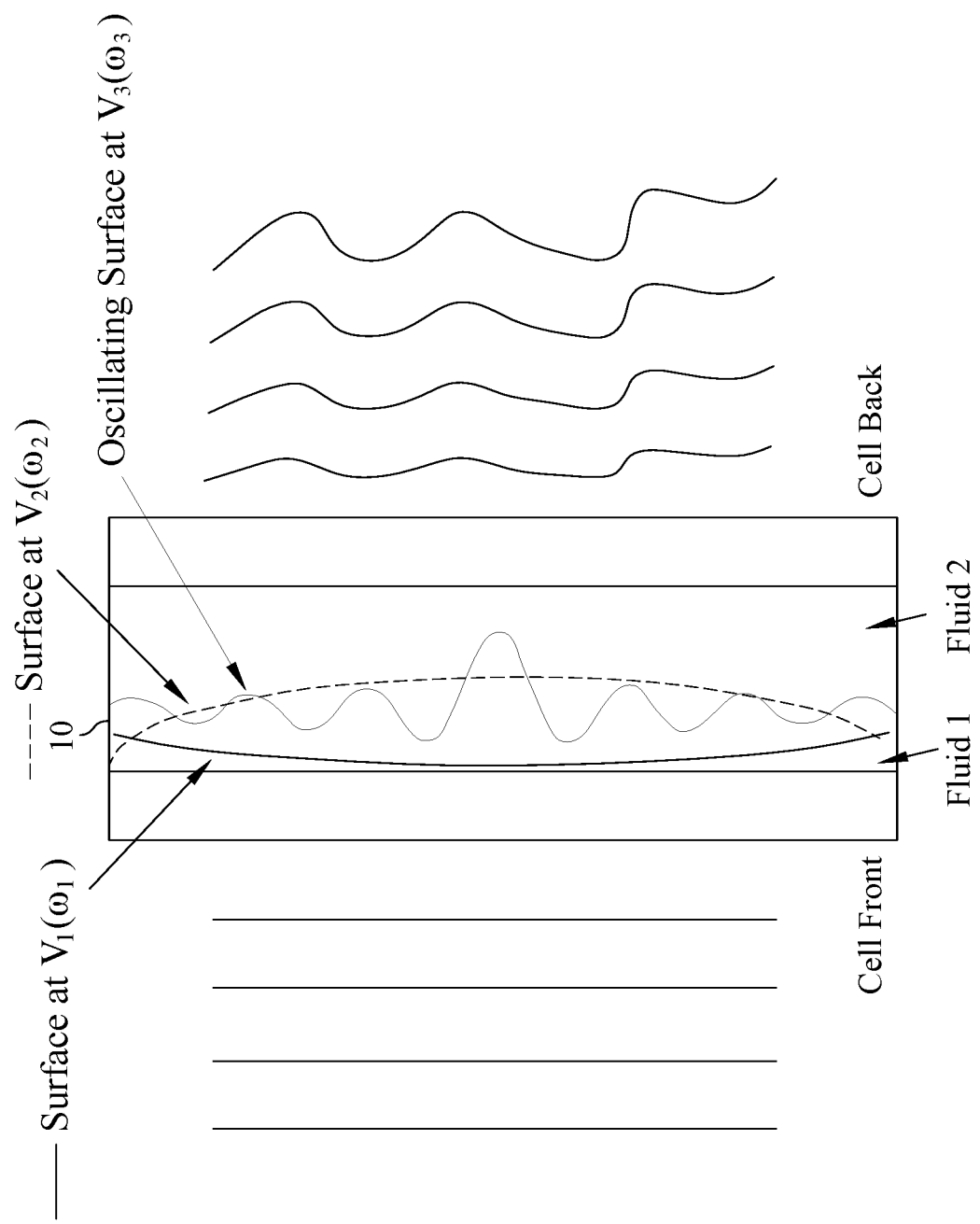
FIG. 4 is an EM beam transmitted through a fluid that exhibits surface patterns as a result of an applied voltage that causes a change on the boundary profile between two fluids. This can be the result of an electrostatic or electrowetting effect.
Figure 5:
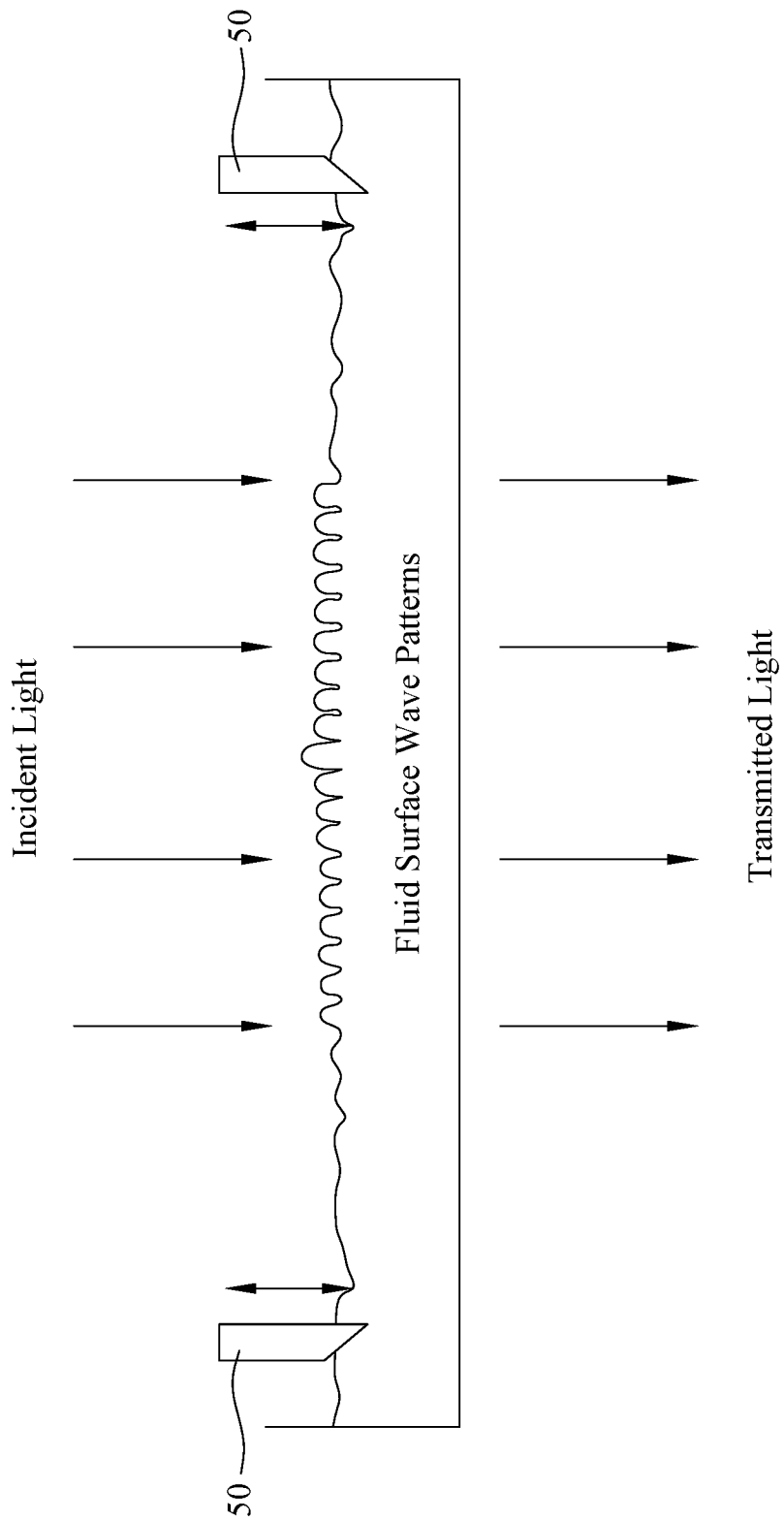
FIG. 5 is an EM beam transmitted through a fluid that exhibits surface patterns as a result of an actuator or multiple actuators bobbing up and down in the fluid. Interference of the fluid surface waves can form spatial-temporal patterns.

The fluid system 10 performs a time-dependent phase change on the EM radiation. This time dependent change can be induced by mechanical vibration in the fluid container 30, acoustic waves through the fluid 32, or by surface tension changes at the boundary of the fluid 32 caused by electrostatic or electrowetting effects. Other forms of inducing changes to a fluid surface or boundary can be the result of actuators 50 shifting in motion underneath the fluid or at the fluid surface to produce pressure waves either inside of the fluid or on the surface. FIGS. 3, 4 and 5 show possible methods of actuating fluid surface waves, or waves on a meniscus profile between two fluids. A solitary wave packet across the fluid surface, or oscillatory wave shapes can be used to change the phase of an EM beam 20. Excitation may incite chaotic motion on the fluid surface, which can be used to the change the phase of an EM beam 20 for encryption, decryption, or authentication.

In one embodiment of the present disclosure, the phase change from a fluid system 10 can augment phase changes from static optical elements with phase altering values randomly distributed spatially to encrypt or decrypt information carried by EM continuous waves. These randomly distributed phase valued optical elements, herein called random phase elements, can be placed on any or multiple sides of the fluid system 10 and in the path of the EM wave. This concept can be demonstrated using approximations common for optical, monochromatic light. However, the light source need not be restricted to the optical band, and need not be restricted to monochromatic light.

Given an optical wave $I(x,y)=A(x,y)e^{j2\pi P(x,y)}$, where $A(x,y)$ is the amplitude and $P(x,y)$ is the phase, incident upon a fluid system with a transmittance function of $F_n(x,y,t_n)$, where $t_n$ is an instance of time, the transmitted wave field would be $$I'(x,y,t_n)=I(x,y)F_n(x,y,t_n) \quad (1)$$

In one embodiment of the present disclosure, the fluid system is a sufficiently shallow homogenous liquid in an open container with a thin, transparent bottom. When using the thin lens approximation, an optical wave $I(x,y,t_n)$ transmitted from and to a medium with refractive index $n_1$ through the liquid with a time and spatially varying height $h_t=h_0+(x,y,t_n)$ and refractive index $n_2$ can be expressed as $$I'(x,y,t_n)=I(x,y)F_n(x,y,t_n)=I(x,y)e^{jkh_0}e^{jk(n2-n1)h(x,y,t_n)} \quad (2)$$

Figure 6:
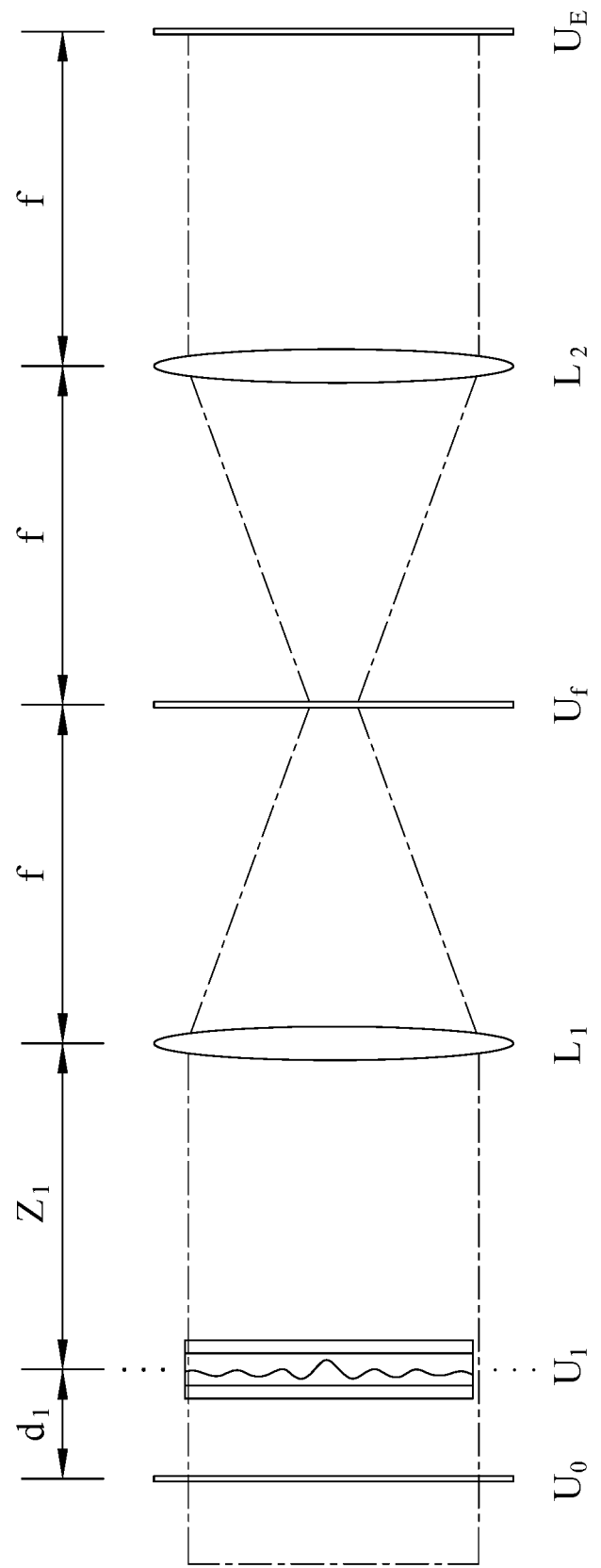
FIG. 6 shows a diagram of a fluid-optical encryption system with two random phase elements $D_1$ and $D_2$, and two lenses L1 and L2. The EM beam at $U_0$ contains an image that has passed through a random phase element $D_1$ or been encoded with random phase values by some other method. The beam at $U_1$ passes through the fluid system. The random phase element $D_2$ can be positioned at the Fourier plane between the two lenses. The $U_E$ plane can be the location of a camera or some photon detection device for recording the encrypted image. Distances $d_1$, $z_1$, and focal length f are determined by the user and contribute to the key space according to a first preferred embodiment of the present disclosure.

In one embodiment of the present disclosure, two random phase elements and two lenses $L_1$ and $L_2$ are used with the fluid system to encrypt or decrypt an image. This system, shown in FIG. 6, can be considered an adaptation of the double random phase encryption system, with the important difference being the fluid system. The random phase elements, $D_1$ and $D_2$ have a value set $\phi_1, \phi_2 \in \{0, \ldots, 2\pi\}$ giving transmittance functions of $D_1=e^{jk\phi_1}$ and $D_2=e^{jk\phi_2}$. The complex image $I(x,y)$ is encrypted per the equations:

$$E_n(x,y,t_n)=OFT^{-1}\{S_n(\nu,\eta,t_n)\cdot D_2(\nu,\eta)\}(x,y,t_n), \quad (3)$$

$$S_n(\nu,\eta,t_n)=OFT\{prop(I(x,y)\cdot D_1(x,y))\cdot F_n(x,y,t_n)\}(\nu,\eta,t_n), \quad (4)$$

where $E_n(x,y,t_n)$ is the complex encrypted image, OFT and $OFT^{-1}$ are the optical Fourier transform and the inverse optical Fourier transform, and the propagation function prop(f) for any complex image f is defined as $$prop(f)=OFT^{-1}\{OFT\{f\exp(jkd(1-\lambda^2(\nu^2+\eta^2)))\}\} \quad (5)$$

Equation (5) defines any image f propagating a distance d with collimated rays perpendicular to the wave-front, a wavelength $\lambda$ (632.8 nm), and wave number $k=2\pi/\lambda$. The coordinates $(\nu,\eta)$ are in the spatial frequency domain. In this embodiment of the present disclosure, the fluid is located one focal length f from the first lens, and the second phase mask $D_2$ is located directly in the Fourier plane between the two lenses. However, these distances can be altered to expand the key space of the encryption/decryption system.

Figure 7:
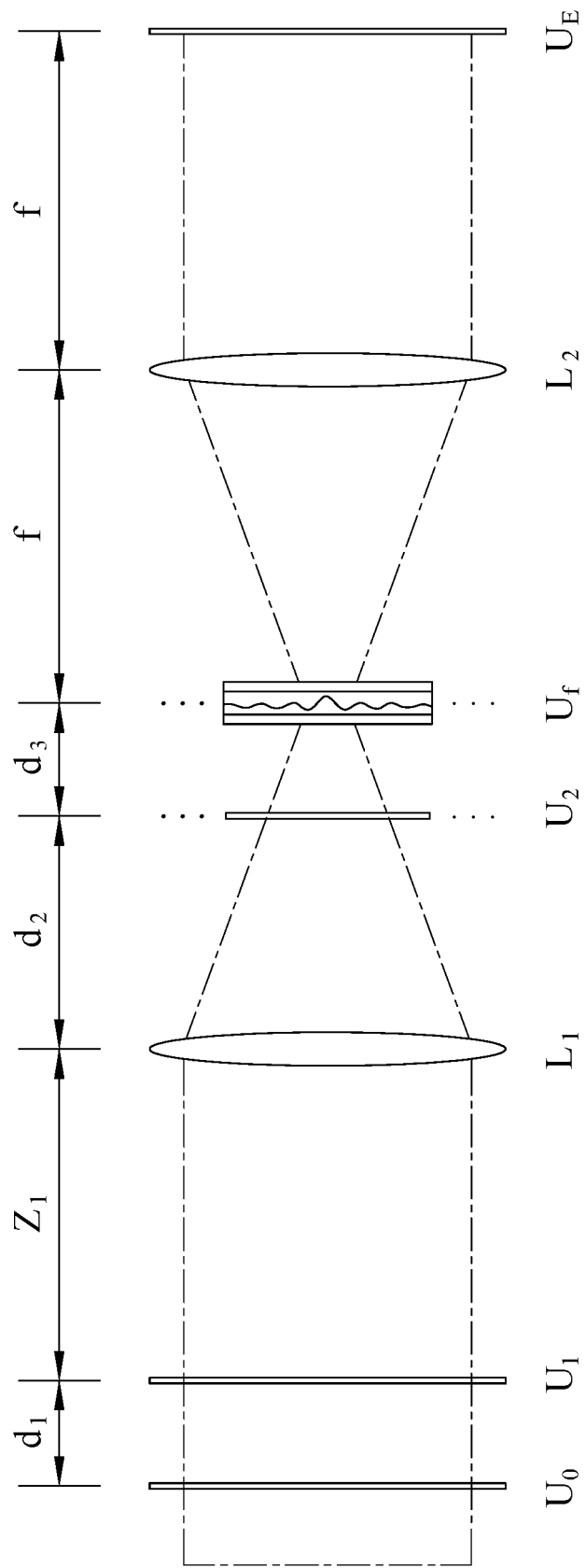
FIG. 7 shows a diagram of a fluid-optical encryption system with two random phase elements $D_1$ and $D_2$, and two lenses L1 and L2. The EM beam at $U_0$ contains an image and passes through a random phase element $D_1$ at $U_1$. The random phase element $D_2$ can be positioned between the Fourier plane and the first lens. The fluid system can be positioned approximately at the Fourier plane $U_F$. The $U_E$ plane can be the location of a camera or some other photon detection device for recording the encrypted image. Distances $d_1$, $z_1$, $d_2$, $d_3$, and focal length f are determined by the user according to a second preferred embodiment of the present disclosure.

In another embodiment of the present disclosure, also using two transmission random phase elements $D_1$ and $D_2$ and two lenses $L_1$ and $L_2$, the fluid is placed in between the two lenses, as shown in FIG. 7. In this embodiment of the present disclosure, the fluid is modulating the spatial frequency components of the image and the phase masks.

Figure 8:
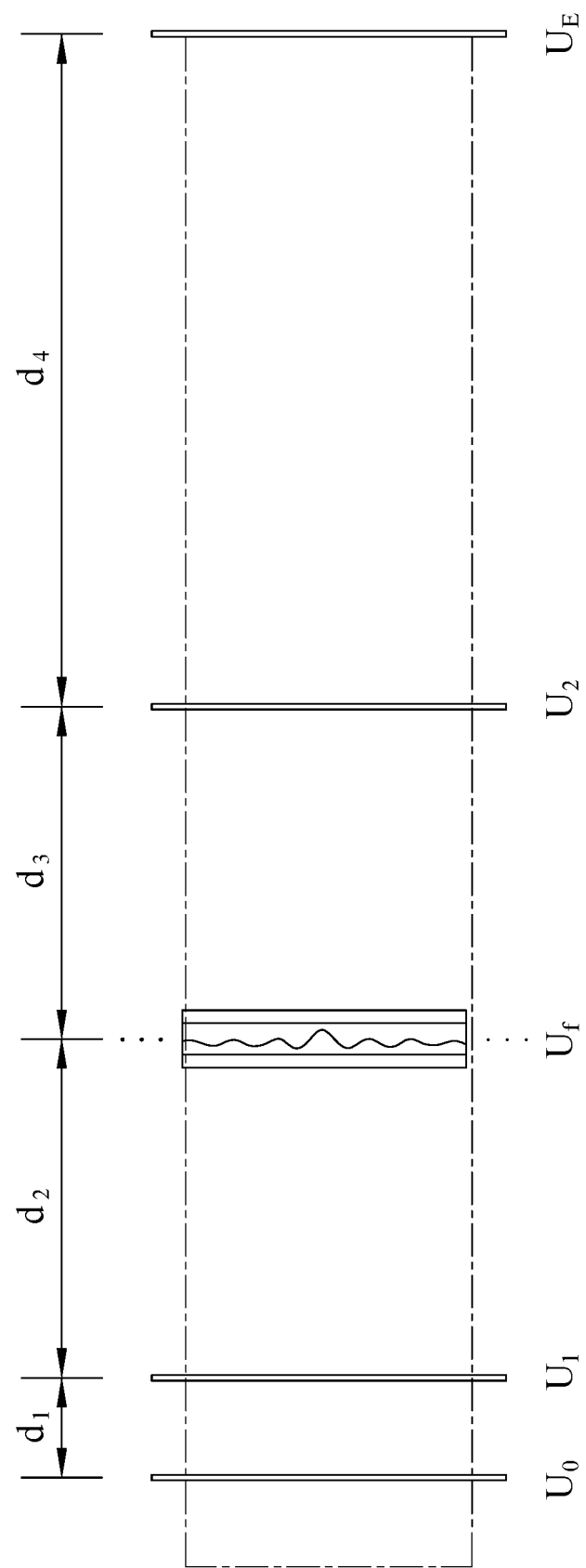
FIG. 8 shows a diagram of a fluid-optical encryption system with two random phase elements $D_1$ and $D_2$, and no lenses. The EM beam at $U_0$ contains an image, and the random phase element $D_1$ can be located at $U_1$. The random phase element $D_2$ can be positioned at $U_2$, and the fluid system at $U_F$. The $U_E$ plane can be the location of a camera or some other photon detection device for recording the encrypted image. Distances $d_1$, $d_2$, $d_3$, $d_4$, and focal length f are determined by the user according to a third preferred embodiment of the present disclosure.

In an alternative embodiment of the present disclosure, the fluid is placed between the first and second phase masks in a lens-less optical encryption/decryption system. An example of such a system is shown in FIG. 8.

Knowledge of the fluid system boundary or surface profile changes must be known by the user. This can be achieved by measurements, predictions, or a combination of both. The knowledge of the fluid system behavior must be secure and inaccessible by adversaries.

Figure 9:
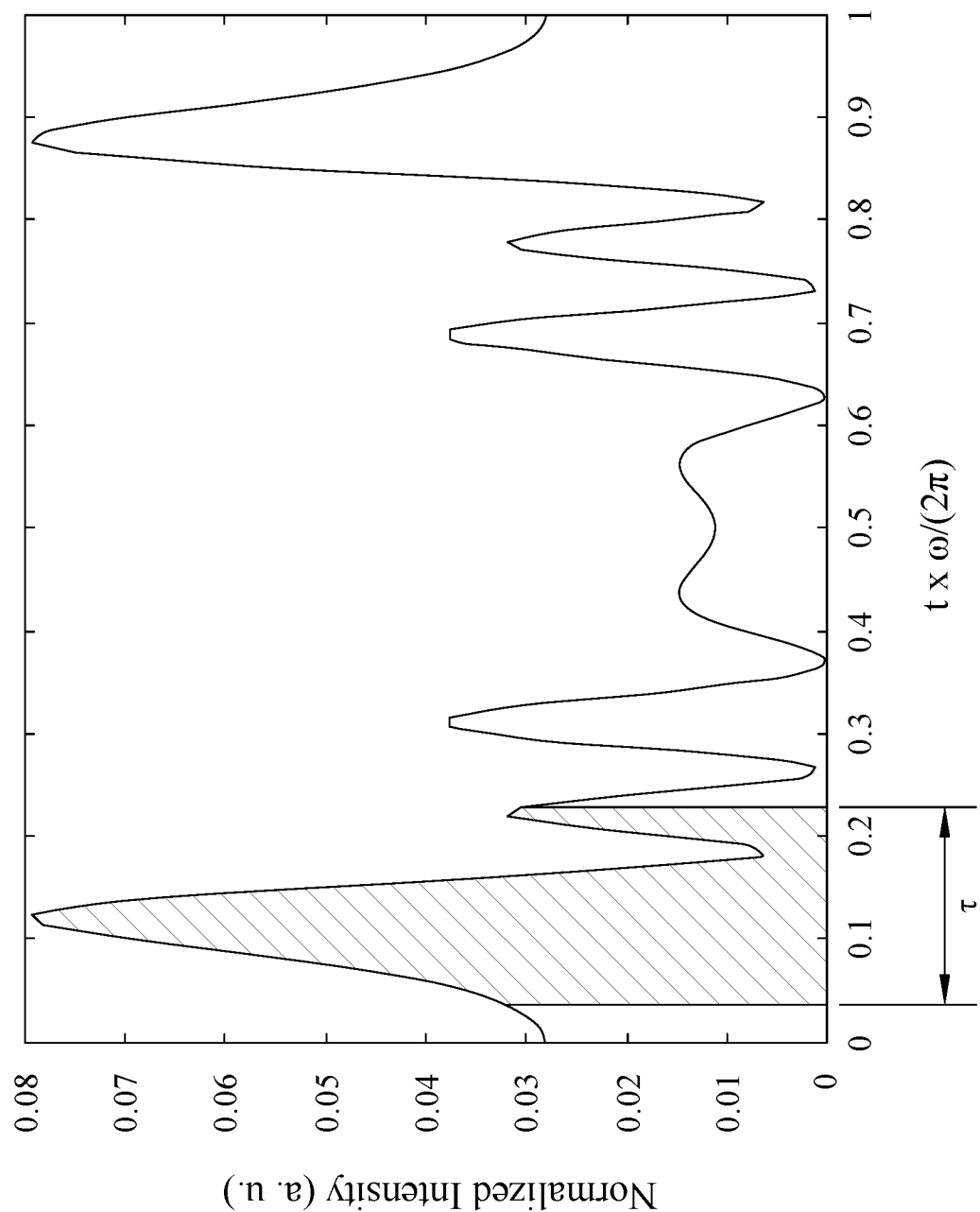
FIG. 9 shows normalized intensity of one pixel in the encrypted image from system shown in FIG. 6, recorded by a camera over one full fluid oscillation. The exposure time is τ, and the summed intensity is shown by the blue area of the plot.

Recording of the encrypted image can be done with a controlled exposure time. Photons are collected over a finite exposure time $\tau$. An example of intensity values for one pixel in an encrypted image over a full fluid oscillation period is shown in FIG. 9. The Integration of the encrypted image $E_n(x,y,t_n)$ and a reference beam $E_R(x,y)$ over the exposure time $\tau$ can be shown as $$E_{rc}(x,y,t_n,\tau)=\int_{t_n}^{t_n+\tau}(I_o+I_R)dt \quad (6)$$

where the intensities of the object and reference beams are $I_o=|E_n(x,y,t_n)|^2$ and $I_R=|E_R(x,y)|^2$, respectively.

If the exposure time is sufficiently small, the encrypted image can be approximated as constant throughout the exposure. Decryption of an image $E(x,y,t_n)$ can then be performed by using the conjugate of the fluid amplitude transmittance at the corresponding time $t_n$, given as $$F_n^*(x,y,t_n)=e^{-jkh_0}e^{-jk(n2-n1)h(x,y,t_n)} \quad (7)$$

Which allows a recovered complex image calculated by $$I_R(x,y,t_n)=e^{j2\pi R(x,y,t_n)}=prop(OFT^{-1}\{Q_n(\nu,\eta,t_n)\}(x,y,t_n))\cdot D_4(x,y) \quad (8)$$

$$Q_n(\nu,\eta,t_n),=OFT\{E_n(x,y,t_n)\}(\nu,\eta,t_n)\cdot D_3(\nu,\eta) \quad (9)$$

where $D_3(\nu,\eta)=D_2^*(\nu,\eta)$ and $D_4(\nu,\eta)=D_1^*(\nu,\eta)$, the complex conjugate random phase elements. If the exposure time is not sufficiently small, the user possessing measurements and/or predictions of the fluid surface behavior during encryption must use the known fluid amplitude during the exposure to perform some calculations to extract the encrypted image at a certain time during the exposure.

Both symmetric key and asymmetric key optical security system implementations can be realized. Symmetric key implementation is realized by the equations (7), (8), and (9). Even with a relatively long exposure time, the recovered image can be found by exposing over the same amount of time, using the complex conjugate random phase elements and conjugate fluid surface profile. For asymmetric key implementation, the random phase elements can be altered to account for the fluid phase change over the corresponding exposure time, and a fluid profile is not needed to further alter the phase in the system. This produces decryption keys that are wholly different from the encryption keys, and not just conjugates.

Figure 10:
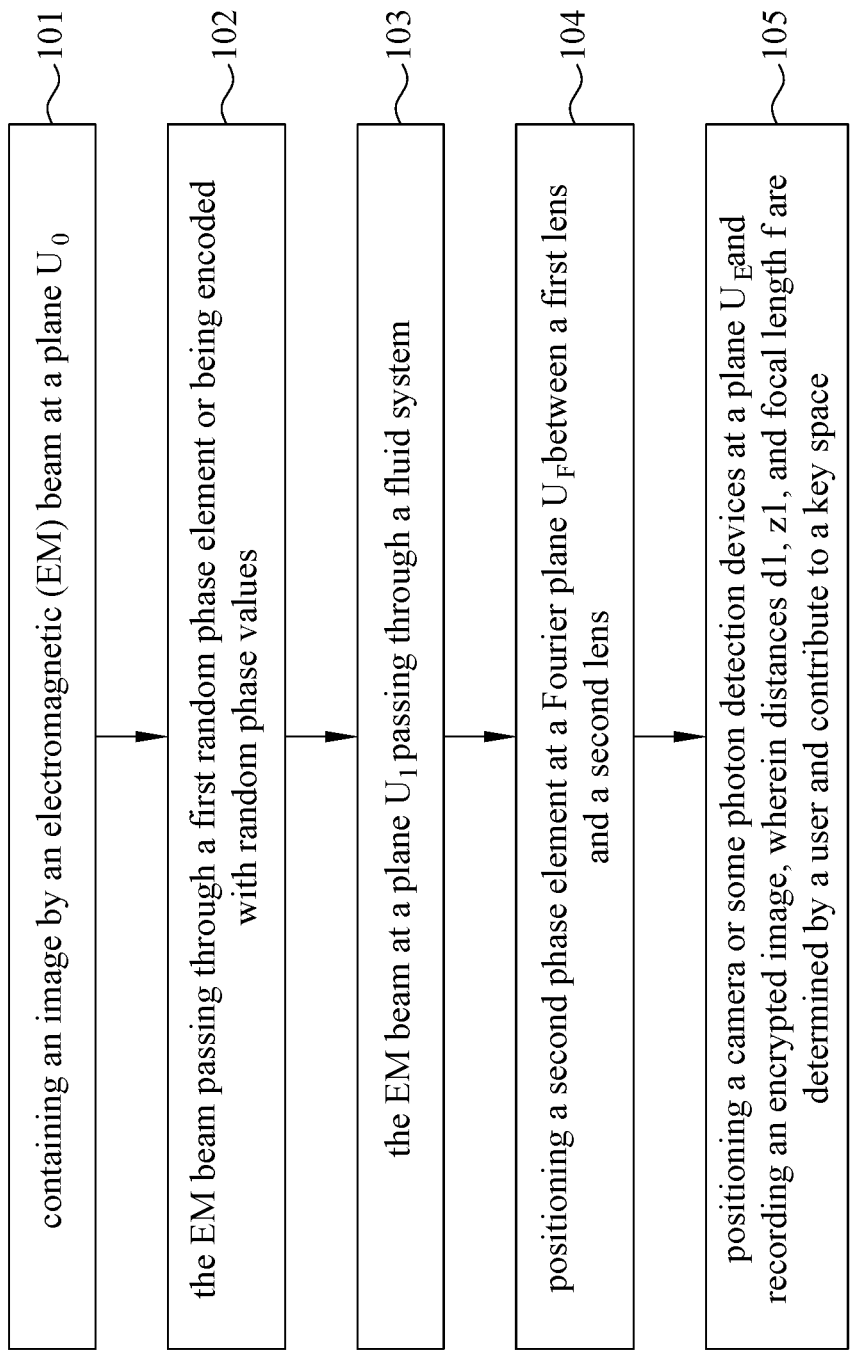
FIG. 10 shows a flow chart of a fluid-optical encryption method according to a first preferred embodiment of the present disclosure.

Based on the above detailed descriptions, it should be noted that a fluid-optical encryption method is also provided. One embodiment of the present disclosure provides a fluid-optical encryption method, as shown in FIG. 10, including the following steps S101~S105:

Step S101: containing an image by an electromagnetic (EM) beam at a plane $U_0$;

Step S102: the EM beam passing through a first random phase element or being encoded with random phase values;

Step S103: the EM beam at a plane $U_1$ passing through a fluid system;

Step S104: positioning a second phase element at a Fourier plane $U_F$ between a first lens and a second lens; and Step S105: positioning a camera or some photon detection devices at a plane $U_E$ and recording an encrypted image, wherein distances $d_1$, $z_1$, and focal length f are determined by a user and contribute to a key space.

Figure 11:
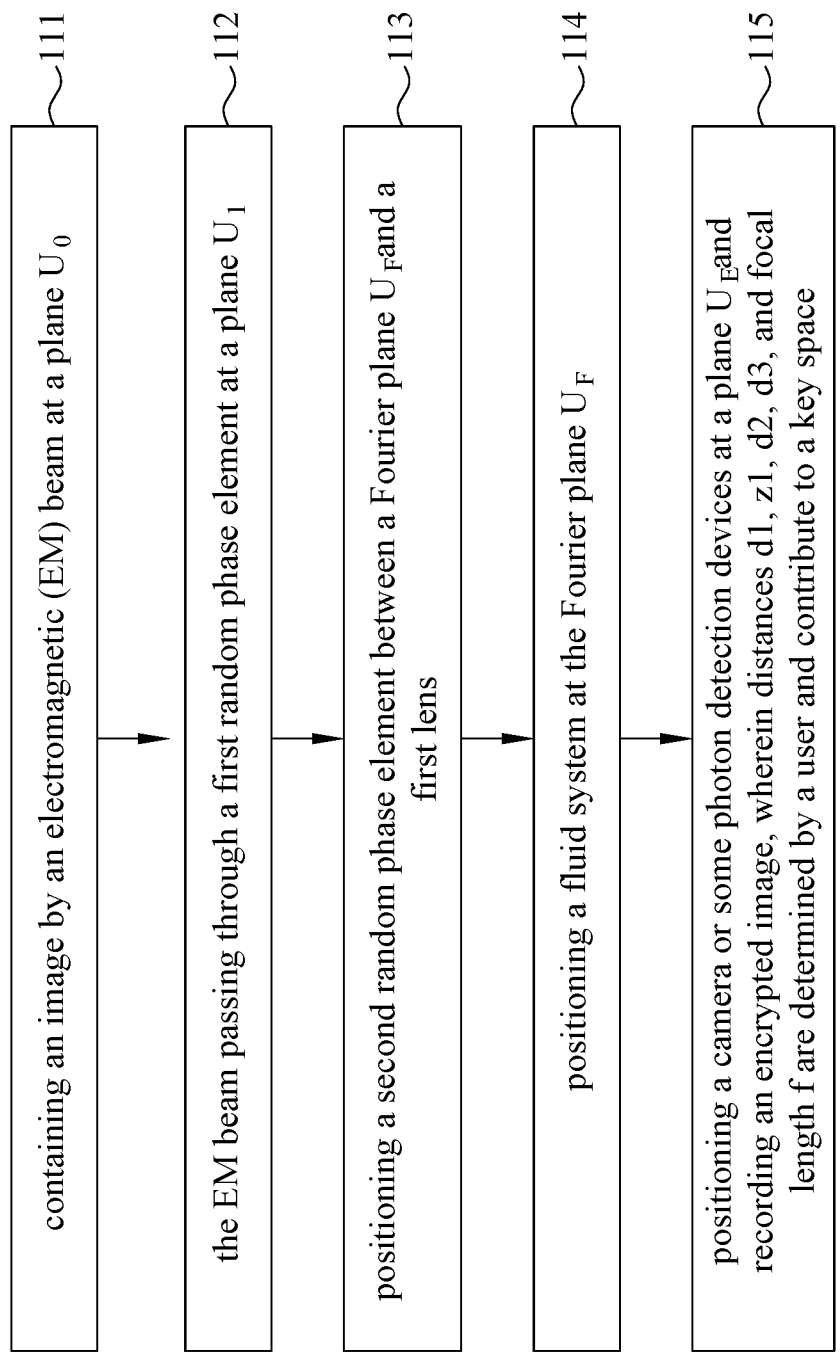
FIG. 11 shows a flow chart of a fluid-optical encryption method according to a second preferred embodiment of the present disclosure.

Another embodiment of the present disclosure provides a fluid-optical encryption method, as shown in FIG. 11, including the following steps S111~S115:

Step S111: containing an image by an electromagnetic (EM) beam at a plane $U_0$;

Step S112: the EM beam passing through a first random phase element at a plane $U_1$;

Step S113: positioning a second random phase element between a Fourier plane $U_F$ and a first lens;

Step S114: positioning a fluid system at the Fourier plane $U_F$; and

Step S115: positioning a camera or some photon detection devices at a plane $U_E$ and recording an encrypted image, wherein distances $d_1$, $z_1$, $d_2$, $d_3$, and focal length f are determined by a user and contribute to a key space.

Figure 12:
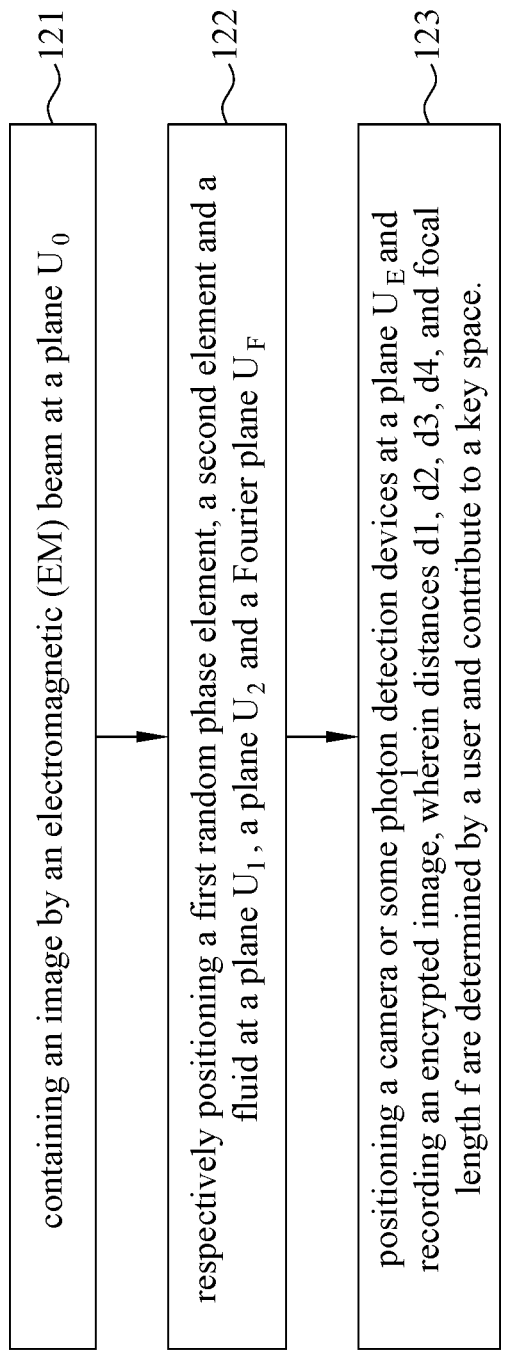
FIG. 12 shows a flow chart of a fluid-optical encryption method according to a third preferred embodiment of the present disclosure.

Further, an alternative embodiment of the present disclosure provides a fluid-optical encryption method, as shown in FIG. 12, including the following steps S121~S123:

Step S121: containing an image by an electromagnetic (EM) beam at a plane $U_0$;

Step S122: respectively positioning a first random phase element, a second element and a fluid at a plane $U_1$, a plane $U_2$ and a Fourier plane $U_F$; and Step S123: positioning a camera or some photon detection devices at a plane $U_E$ and recording an encrypted image, wherein distances $d_1$, $d_2$, $d_3$, $d_4$, and focal length f are determined by a user and contribute to a key space.

The addition of a controlled fluid system with time-dependent phase modulation provides a time dependent phase change on the information carrying optical beam that can protect against known and chosen plaintext/ciphertext attacks. Additionally, the fluid system can act as a dynamic lens with adjustable focus to add adaptiveness and flexibility to a random phase element security system.

Although the present disclosure has been described with reference to the preferred embodiments, it will be understood that the disclosure is not limited to the details described thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A fluid-optical encryption system, comprising:
a first random phase element, a second random phase element, a first lens, a second lens and a fluid system, wherein an electromagnetic (EM) beam at a plane $U_0$ contains an image that has passed through the first random phase element or been encoded with random phase values; the EM beam at a plane $U_1$ passes through the fluid system; the fluid system includes at least one fluid that directly alters one or more properties of the EM beam; the second random phase element is positioned at a Fourier plane $U_F$ between the first lens and the second lens; a plane $U_E$ is the location of a camera or some photon detection devices for recording an encrypted image; and distances $d_1$, $z_1$ and focal length f are determined by a user and contribute to a key space; and
wherein $d_1$ is the distance between the plane $U_0$ and the plane $U_1$, $z_1$ is the distance between the plane $U_1$ and the first lens, f is the distance between the second lens and the plane $U_E$, and the first and second random phase elements and the first and second lenses are used with the fluid system to encrypt the image.

2. The fluid-optical encryption system of claim 1, wherein the first random phase element and the second random phase element each are a phase mask or a spatial light modulator (SLM).

3. The fluid-optical encryption system of claim 1, wherein the fluid system is used once or multiple times in the fluid-optical encryption system.

4. The fluid-optical encryption system of claim 1, wherein the encrypted image or series of images are recorded over a finite period of time.

5. The fluid-optical encryption system of claim 1, wherein the fluid system alters the phase, path length or polarization of the EM beam over time according to the motion or boundary of the at least one fluid.

6. The fluid-optical encryption system of claim 1, wherein at least a fluid surface profile or a fluid surface boundary is varied spatially and temporally and is used as an adaptive lens for the fluid-optical encryption system.

7. The fluid-optical encryption system of claim 1, wherein a reflective mirror array is used as a reflective surface for the fluid-optical encryption system.

8. A fluid-optical encryption system, comprising:
a first random phase element, a second random phase element, a first lens, a second lens and a fluid system, wherein an electromagnetic (EM) beam at a plane $U_0$ contains an image and passes through the first random phase element at a plane $U_1$; the second random phase element is positioned at a plane $U_2$ between a Fourier plane $U_F$ and the first lens; the fluid system is positioned at the Fourier plane $U_F$ between the first lens and the second lens and includes at least one fluid that directly alters one or more properties of the EM beam; a plane $U_E$ is the location of a camera or some photon detection devices for recording an encrypted image; and distances $d_1$, $z_1$, $d_2$, $d_3$, and focal length f are determined by a user and contribute to a key space; and
wherein $d_1$ is the distance between the plane $U_0$ and the plane $U_1$, $z_1$ is the distance between the plane $U_1$ and the first lens, $d_2$ is the distance between the first lens and the plane $U_2$, $d_3$ is the distance between the plane $U_2$ and the Fourier plane $U_F$, f is the distance between the second lens and the plane $U_E$, and the first and second random phase elements and the first and second lenses are used with the fluid system to encrypt the image.

9. A fluid-optical encryption system, comprising:
a first random phase element, a second random phase element and a fluid system, wherein an electromagnetic (EM) beam at a plane $U_O$ contains an image; the first random phase element is located at a plane $U_1$; the second random phase element is positioned at a plane $U_2$; the fluid system is positioned at a Fourier plane $U_F$ and includes at least one fluid that directly alters one or more properties of the EM beam; a plane $U_E$ is the location of a camera or some photon detection devices for recording an encrypted image; and distances $d_1$, $d_2$, $d_3$, and $d_4$ are determined by the user and contribute to a key space; and wherein $d_1$ is the distance between the plane $U_O$ and the plane $U_1$, $d_2$ is the distance between the plane $U_1$ and the Fourier plane $U_F$, $d_3$ is the distance between the Fourier plane $U_F$ and the plane $U_2$, $d_4$ is the distance between the plane $U_2$ and the plane $U_E$, and the first and second random phase elements are used with the fluid system to encrypt the image.

10. A fluid-optical encryption method, comprising the steps of:

containing an image by an electromagnetic (EM) beam at a plane $U_O$;

the EM beam passing through a first random phase element or being encoded with random phase values at the plane $U_O$;

the EM beam at a plane $U_1$ passing through a fluid system;

positioning a second phase element at a Fourier plane $U_F$ between a first lens and a second lens; and positioning a camera or some photon detection devices at a plane $U_E$ and recording an encrypted image, wherein the fluid system includes at least one fluid that directly alters one or more properties of the EM beam and distances $d_1$, $z_1$, and focal length f are determined by a user and contribute to a key space; and wherein $d_1$ is the distance between the plane $U_O$ and the plane $U_1$, $z_1$ is the distance between the plane $U_1$ and the first lens, f is the distance between the second lens and the plane $U_E$, and the first and second random phase elements and the first and second lenses are used with the fluid system to encrypt the image.

11. The fluid-optical encryption method of claim 10, wherein the step of recording an encrypted image includes recording the encrypted image or series of images over a finite period of time.

12. The fluid-optical encryption method of claim 11, further comprising the step of altering the phase, path length or polarization of the EM beam by the fluid system over time according to the motion or boundary of the at least one fluid.

13. The fluid-optical encryption method of claim 11, further comprising the step of spatially and temporally varying at least a fluid surface profile or a fluid surface boundary that encodes the EM beam.

14. A fluid-optical encryption method, comprising the steps of:

containing an image by an electromagnetic (EM) beam at a plane $U_O$;

the EM beam passing through a first random phase element at a plane $U_1$;

positioning a second random phase element at plane $U_2$ between a Fourier plane $U_F$ and a first lens;

positioning a fluid system at the Fourier plane $U_F$ between the first lens and a second lens; and positioning a camera or some photon detection devices at a plane $U_E$ and recording an encrypted image, wherein the fluid system includes at least one fluid that directly alters one or more properties of the EM beam and distances $d_1$, $z_1$, $d_2$, $d_3$, and focal length f are determined by a user and contribute to a key space; and wherein $d_1$ is the distance between the plane $U_O$ and the plane $U_1$, $z_1$ is the distance between the plane $U_1$ and the first lens, $d_2$ is the distance between the first lens and the plane $U_2$, $d_3$ is the distance between the plane $U_2$ and the Fourier plane $U_F$, f is the distance between the second lens and the plane $U_E$, and the first and second random phase elements and the first and second lenses are used with the fluid system to encrypt the image.

15. A fluid-optical encryption method, comprising the steps of:

containing an image by an electromagnetic (EM) beam at a plane $U_O$;

respectively positioning a first random phase element, a second random phase element and a fluid system at a plane $U_1$, a plane $U_2$ and a Fourier plane $U_F$; and positioning a camera or some photon detection devices at a plane $U_E$ and recording an encrypted image, wherein the fluid system includes at least one fluid that directly alters one or more properties of the EM beam and distances $d_1$, $d_2$, $d_3$, and $d_4$ are determined by a user and contribute to a key space; and wherein $d_1$ is the distance between the plane $U_O$ and the plane $U_1$, $d_2$ is the distance between the plane $U_1$ and the Fourier plane $U_F$, $d_3$ is the distance between the Fourier plane $U_F$ and the plane $U_3$ $d_4$ is the distance between the plane $U_2$ and the plane $U_F$, and the first and second random phase elements are used with the fluid system to encrypt the image.

* * * * *